March 21, 1939. R. P. FISHER 2,151,348
ROTARY DRILL BIT
Filed April 13, 1938 2 Sheets-Sheet 1
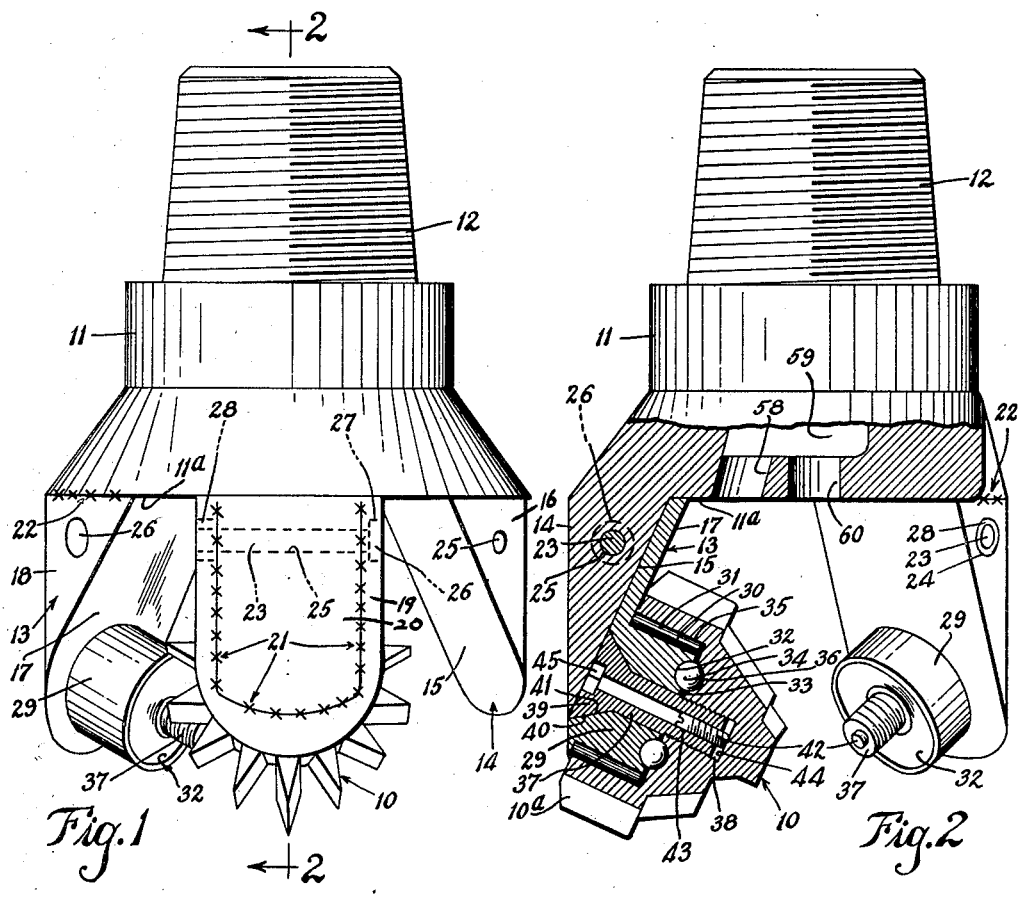
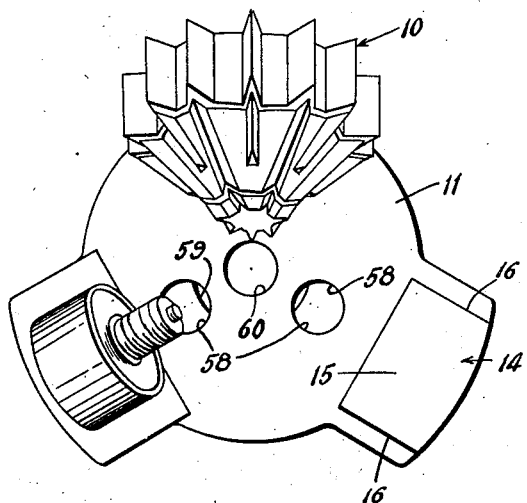
INVENTOR.
Robert P. Fisher
BY
ATTORNEY.

March 21, 1939.  R. P. FISHER  2,151,348
ROTARY DRILL BIT
Filed April 13, 1938  2 Sheets-Sheet 2
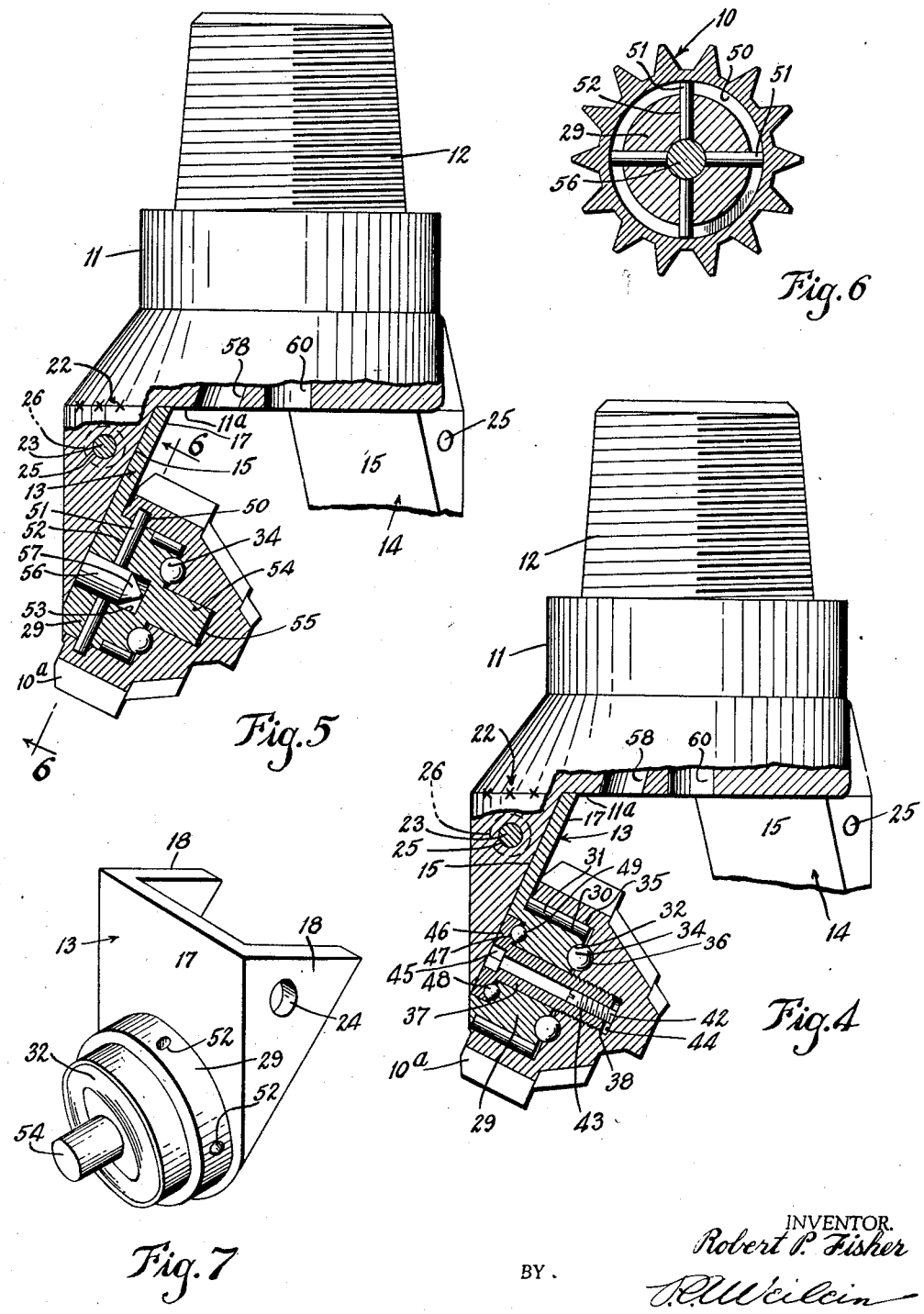
INVENTOR.
Robert P. Fisher
BY
ATTORNEY.

Patented Mar. 21, 1939

2,151,348

UNITED STATES PATENT OFFICE 2,151,348

ROTARY DRILL BIT

Robert P. Fisher, Los Angeles, Calif., assignor of fifty-one per cent to Rudolph Pageman, Los Angeles County, Calif.

Application April 13, 1938, Serial No. 201,750

16 Claims. (Cl. 255—71)

The present invention relates to drilling tools, and more particularly to earth boring tools of the type used in drilling wells; being specifically directed to drilling tools having cutters rotatably supported upon a bit head or shank.

This application is a continuation in part of my application Serial No. 190,444, filed February 14, 1938, and entitled "Rotary drill bit".

Various kinds of rotary earth boring drilling tools are known. However, they usually possess the disadvantage of non-replaceability of their cutting elements, which suffer the most wear in usage, and of other worn parts; resulting in a manifest waste of materials occasioned by the necessity of discarding the entire drilling tool after the cutters are worn, even though many of its essential parts are still serviceable. Efforts have been made to provide drill bits having replaceable parts, but the result is generally a complex tool having many elements easily susceptible of working loose while the tool is in operation. Moreover, it is difficult to produce such a tool to the required gauge, in view of the need for accurate finishing of its component parts and the effects of welding a hard facing to the cutter teeth. Invariably, diligent and comprehensive grinding of the teeth must be resorted to after assembly before the tool will be capable of producing the desired size of bore hole.

A further deterrent to successful and efficient drilling is the inability of many drill bits having roller cutters to produce a full gauge hole. A factor conducive to undergauge hole production is the inwardly directed end thrust of the walls of the bore upon the cutter reaming teeth, tending to move the cutters inwardly towards the bore axis and decreasing the effective diameter of the tool. While this inward thrust is counteracted somewhat by the engagement of the cutters with the bottom of the hole, the use of the tool as a reamer causes the thrust to be most pronounced, especially when it is desired to straighten a crooked hole.

Accordingly, it is an object of the present invention to provide a drill bit of simple construction and design in which parts subjected to wear are easily replaceable.

A further object of the invention involves a drilling tool having parts assembled to the bit body by welding, but which can be readily disassembled therefrom.

Yet another object of the invention relates to a drilling tool having cutter and bearing supporting members detachably secured to a bit head whereby they can be easily placed thereon and removed therefrom.

Another object of the invention resides in the provision of a drilling tool having adjustably supported cutters movable within limits to be capable of varying their effective hole producing diameter.

Still another object of the invention is to provide a drilling tool of a construction permitting the obtaining of an accurate hole producing diameter without the necessity for finish grinding the cutters, or resort to other finishing operations.

A further object of the invention is to provide an improved bearing construction for rotatably mounting drill bit cutters.

A further object of the invention lies in the provision of an improved bearing for rotatably mounting and retaining drill bit cutters thereon.

Yet another object of the invention is to provide an improved bearing construction for resisting axially inward thrusts on a drill bit cutter.

Other objects and advantages of the invention will appear in the following specification of the preferred embodiments of the invention which are shown in the attached drawings of which:

Figure 1 is a side elevation of one embodiment of the invention, parts being omitted for purposes of clarity.

Figure 2 is a longitudinal section, taken as seen along line 2—2 of Figure 1.

Figure 3 is a bottom plan view of the drill bit shown in Figure 1.

Figure 4 is a partially longitudinal section, similar to Figure 2, of a modified form of drill bit.

Figure 5 is a partially longitudinal section, similar to Figure 2, of still another modification of the drill bit.

Figure 6 is a transverse section, taken as seen along line 6—6 of Figure 5, and

Figure 7 is a perspective view of the bearing supporting member and bearing extension shown in Figure 5.

The various forms of drilling tools disclosed in the drawings have cutters 10 rotatably supported by a bit head or body 11, which is attachable to the usual drill collar or drilling string (not shown) through the agency of a tapered pin 12. In all of the forms of invention disclosed, each of the cutters is rotatably mounted upon a bearing supporting member 13, which is detachably secured to a leg 14 depending from the bit body. Each leg has an inner thrust surface 15, tapering downwardly and outwardly, and also generally triangular side faces 16, 16 preferably parallel to one another. Each bearing supporting member 13 is formed to fit around a leg by being provided with a web 17 engageable against the inner thrust surface 15 and a pair of spaced generally triangular wings 18, 18 embracing the side faces 16, 16 of the legs with their edges 19 terminating at an outer face 20 of the leg.

Upon being assembled on one of the legs, the bearing supporting member can be rigidly secured thereto by means of the welds 21 fastening the edges of the side wings to the outer face of the leg, and by other welds 22 fastening the upper ends of the wings to the leg and bit body. Although the welds are of sufficient strength to prevent separation of the bearing supporting member from the leg during use of the tool, as a precautionary measure, a stud or bolt 23 can be inserted through cooperating holes 24, 25 provided in the upper parts of the wings and leg, the head 26 of the bolt being contained in a recess 27 in one of the wings, its other end being fastened to the other wing by the weld 28.

Because of the described arrangement, a cutter 10 and its bearing supporting member 13 can be readily mounted upon a leg 14 depending from the bit body by placing the bearing wings and web snugly against the cooperating side and thrust faces of the leg. Although not essential, usually the wings and web will be moved along the leg until their end portions contact with the undersurface 11a of the bit body, whereupon the bolt 23 can be inserted through the holes 24, 25 and the various parts welded together, in the manner aforementioned.

The bearing support 13 can be easily disassembled from a bit or shank leg by cutting away the various welds with an oxy-acetylene or other gas torch, or with an electric arc. The weld holding the bolt in place can be removed either by burning it away or by drilling through it. Removal of the welds is accomplished without difficulty, leaving the various parts, and particularly the bit body and legs, in a condition substantially unaffected by the cutting operation. A new cutter and any other worn parts can be assembled on the bearing supporting member, which can then be placed over the bit leg and rewelded thereto.

For the purpose of clearly disclosing the constructional details of the drilling tool, the various figures do not show all of the parts comprising the bit. However, it is apparent that the specific tool illustrated contemplates a bit body or shank having three depending legs 14, each carrying a bearing supporting member which rotatably mounts a conical cutter 10. That is, in its complete form the tool illustrated will have three conical cutters rotatably carried on bearing supporting members, each fastened to an individual depending leg. It is to be understood that although three cutter assemblies are included within the disclosed construction, this number can be either increased or decreased without departing from the broad aspects of the invention; and that cutters other than those of conical shape can be used.

In the form of invention disclosed in Figures 1, 2 and 3, each cutter 10 is rotatably mounted and carried upon a bearing 29 extending inwardly and downwardly from the web 17 of the bearing supporting member 13. The bearing includes an external raceway 30 on which a plurality of rollers 31 can move, and a ball raceway 32 in its inner end face 33, forming a track for a plurality of balls 34. The cutter has complementary roller and ball raceways 35, 36 for respective rolling engagement with the rollers and balls. By this bearing construction radial loads on the cutter are transmitted to the bearing through the rollers 31, whereas outwardly directed end thrusts are transmitted to the bearing through the balls 34.

Means are provided for effectively resisting inwardly directed end thrusts on each cutter. Such means can take the form of a thrust pin 37 threaded at its inner end into the sides of a bore 38 near the apex portion of the cutter, with a head 39 of the thrust pin having a frusto-conical outer bearing surface 40 engageable with the walls of a corresponding frusto-conical bore 41 in the outer end of the bearing 29. The cutter and thrust pin are adapted to move as a unit, the two being held rigidly together by the lock screw 42 threadedly received in an axial bore 43 in the thrust pin with its end engageable with the bottom 44 of the cutter bore 38.

With the bearing supporting member 13 disassembled from a bit leg, the rollers 31 can be placed on the outer bearing raceway 30 and the balls 34 placed in the end thrust raceway 32. A cutter can then be located over the bearing into proper cooperative position with the balls and rollers, whereupon the thrust pin 37 can be inserted through the bearing and threaded into the cutter bore until its tapered head 39 engages with the frusto-conical bearing surface 41. The thrust pin can be rotated by means of a suitable tool fitting within its end socket 45, until a condition is reached wherein the balls are free to roll in the bearing raceways and any material inward end play of the cutter is prevented by engagement between the frusto-conical surfaces on the tapered head and bearing. Thereafter, a suitable tool is inserted through the axial bore 43 in the pin and the set screw 42 tightened against the bottom of the apex bore in the cutter. In operation, the cutter, thrust pin and set screw must move as a unit since any relative turning tendencies between the cutter and pin will cause the former to be urged strongly against the end of the set screw. With the parts thus mounted on the bearing supporting member 13 the latter can be welded to the bit leg, as aforementioned. Disassembly of the cutter and bearing can be accomplished by loosening the set screw and rotating the cutter with respect to the thrust pin.

It will be noted that the tapered thrust pin head 39 provides a large bearing area capable of effectively resisting inwardly directed end thrusts. The sliding friction associated with this type of head can be eliminated by resorting to the modified form of bearing construction disclosed in Figure 4, wherein the thrust pin head 46 is provided with a ball raceway 47 receiving a plurality of balls 48 that are also rollable in a toric raceway 49 in the bearing member 29.

Another modified form of bearing for rotatably mounting and retaining a cutter is shown in Figures 5, 6 and 7. In general, the same arrangement of roller and ball bearings and raceways is used as heretofore described in connection with Figures 1 to 4, inclusive. However, a different expedient is employed for retaining the cutter on the bearing and for resisting inwardly directed end thrusts. Such expedient consists of an inner circumferential groove 50 in the cutter, which is adapted to receive a plurality of pins 51 disposed in a plurality of radial holes 52 in the bearing 29, the holes extending from an axial bore 53 in the bearing to the periphery thereof.

When the cutter is to be assembled to the bearing supporting member, the rollers 31 and balls 34 are placed in their respective raceways and the pins 51 inserted in the radial holes 52. The cutter 10 is then placed over the bearing with a cylindrical axial bearing extension 54 rotatably fitting in an apex cutter bore 55 to center the cutter and provide additional bearing support thereto. When placing the cutter on the bearing, the radial pins 51 do not project beyond the bearing periphery, since their inner ends can be positioned in the axial bearing bore 53. However, after mounting the cutter on the bearing it can be maintained in position by moving the pins 51 radially outwardly into the cutter groove 50, which motion is induced by inserting pin 56 having a tapered end 57 in the bore 53. Upon being expanded outwardly, the pins are prevented from moving inwardly by engagement of their inner ends with the cylindrical surface of the pin 56.

Mounting of the bearing supporting member 13 on a leg 14 will confront the outer end of the taper pin 56 with the tapered leg surface 15, thereby preventing removal of the pin and insuring that the radial pins 51 will extend into the groove 50 to retain the cutter on the bearing. The radial pins will also resist inwardly directed end thrust on the cutter, functioning as a thrust bearing having little sliding friction in view of the ability of the radial pins to rotate in their confining bores. As wear occurs on the ball raceways, these pins can also function as roller bearings for transmitting outwardly directed end thrusts between the cutter and bearing.

Disassembly of the cutter from the bearing is easily accomplished after the bearing supporting member has been removed from the bit leg. Removal of the tapered pin 56 will permit the radial pins to be retracted into the axial bore and away from the cutter groove. The cutter can thereafter be moved endwise from the bearing and a different one substituted for it.

In all of the modifications described, substantially no wear occurs on the bit head and legs. The legs are protected from sliding action against the formation by the extension of the cutter reaming teeth 10a beyond the confines of the legs. As a consequence of this lack of wear and because of the replaceability of the cutter and bearing elements, each bit head can be used for a plurality of runs at a resulting substantial savings in materials and associated expenses. No machine work is necessary on the shank legs since the accuracy with which they can be cast is sufficient to insure proper mounting of the bearing supporting members thereon, and a resulting tool of proper gauge.

Inaccuracies associated with cumulative errors in machining and heat treating of parts and welding a hard facing to the cutting teeth can be compensated for in assembling the cutters and bearing supporting members on the legs. Attention is directed to the inclined thrust face 15 on each leg, which will produce a radial movement of each cutter upon longitudinal sliding of the web 17 upon the thrust face. Thus, the bearing supporting members 13 can be mounted upon their respective legs and a ring gauge of the desired diameter placed over the cutters, each bearing supporting member being moved on the inclined thrust face until the cutters are in proper position with their extremities all falling on a circle of the requisite diameter, as determined by their contact with the inner circumference of the ring gauge. Each bearing support can then be tacked by welding to its associated leg to hold the parts in properly assembled gauge position pending subsequent complete welding of the wings 18 to the legs, in the manner aforementioned. Assurance is therefore had that the finally welded and completed bit will be to proper gauge, eliminating the necessity for final grinding encountered in the prior art devices.

It is to be noted further that the same size cutters can be used to produce different bore hole dimensions. For example, moving of the bearing supporting members 13 downwardly on the inclined thrust faces 15 will position the cutters further outwardly to provide a bit capable of forming a larger bore. The converse is true of upward movement of the supporting members on the thrust faces.

Cuttings are removed from the cutters by directing a stream of drilling fluid onto the cutters through orifices 58 communicating with a central fluid passage 59 in the bit head. Additional fluid is directed to the bottom of the hole through a center orifice 60, also having communication with the central fluid passage.

While I have shown and described the preferred embodiments of my invention, it is to be understood that the present invention is not to be limited to the precise details of construction herein shown and described. It is therefore my intention that the scope of my invention be unrestricted other than by the appended claims.

I claim:

1. In a rotary drill bit, the combination of a shank adapted for attachment to a drill stem for rotation thereby having a thrust surface inclined downwardly and outwardly and a side face at either side of the thrust surface; a cutter-bearing member comprising a body having a surface adapted to bear against the shank thrust surface in load-transmitting relation, and side wings engaging said side faces on the shank to hold the bearing member against relative lateral movement; means securing the cutter-bearing member to the shank; and a cutter rotatably mounted on the bearing member.

2. In a rotary drill bit, the combination of a shank adapted for attachment to a drill stem for rotation thereby and formed with a downwardly extending leg portion having a thrust surface inclined downwardly and outwardly and a side face at either side of the thrust surface; a cutter-bearing member comprising a journal bearing, an integral body having a surface adapted to bear against the shank leg thrust surface in load-transmitting relation, and side wings engaging said side faces on the shank leg to hold the bearing member against relative lateral movement; lock means securing the cutter-bearing member to the shank; and a cutter rotatably mounted on the journal bearing.

3. In a rotary drill bit, the combination of a shank adapted for attachment to a drill stem for rotation thereby and formed with a plurality of circumferentially spaced downwardly extending leg portions, each leg portion having a thrust surface inclined downwardly and outwardly and a side face at either side of the thrust surface; a cutter-bearing member mounted on each shank leg, comprising a body having a surface adapted to bear against the shank leg thrust surface in load-transmitting relation, and side wings engaging said side faces on the shank leg to hold the bearing member against relative lateral movement; lock means securing the cutter-bearing members to the shank; and a cutter rotatably mounted on each bearing member.

4. In a rotary drill bit, the combination of a shank adapted for attachment to a drill stem for rotation thereby and having a thrust surface inclined outwardly and downwardly; a detachable cutter-bearing member having a surface adapted to bear against the shank thrust surface in load-transmitting relation; a cutter rotatably mounted on the bearing member; and means securing the bearing member to the shank comprising a pair of integral wings on the bearing member engaging between them a portion of the shank to prevent relative lateral movement, and a locking pin passing through the wings and the shank portion between them to prevent relative longitudinal movement.

5. In a rotary drill bit, the combination of a shank adapted for attachment to a drill stem for rotation thereby and having a thrust surface inclined outwardly and downwardly; a detachable cutter-bearing member having a surface adapted to bear against the shank thrust surface in load-transmitting relation; means securing the cutter-bearing member to the shank; a cutter rotatably mounted on the bearing member; and means locking the cutter on the bearing comprising an annular groove inside the bearing surface of the cutter, a plurality of radially movable rollable pins on the bearing adapted when forced outwardly to enter the annular groove to prevent axial movement of the cutter, and a pin movable without rotation axially within the bearing to an advanced position to force said rollable pins outwardly.

6. In a rotary drill bit, the combination of a shank adapted for attachment to a drill stem for rotation thereby and having an inclined thrust surface; a detachable cutter-bearing member having a surface adapted to bear against the shank thrust surface in load-transmitting relation; means securing the cutter bearing member to the shank; a cutter rotatably mounted on the bearing member; and means locking the cutter on the bearing including a pin movable without rotation axially within the bearing to an advanced position, said shank holding the pin in said advanced position when the cutter-bearing member engages the shank thrust surface.

7. In a rotary drill bit, the combination of a shank having a thrust surface inclined with respect to the longitudinal axis of the shank and a side face at either side of said thrust surface, a bearing supporting member having a surface cooperable with said thrust surface in load transmitting relation, and side wings engaging said side faces on the shank to hold the bearing member against relative lateral movement, means securing supporting member to the shank, and a cutter rotatably mounted on the bearing supporting member.

8. In a rotary drill bit, the combination of a shank having one or more depending legs provided with a thrust surface inclined with respect to the longitudinal axis of the shank and a side face at either side of said thrust surface, a bearing supporting member for each leg having a surface cooperable with said thrust surface in load transmitting relation, and side wings embracing said side faces on the leg to hold the bearing member against relative lateral movement, means securing the bearing supporting member to the leg, and a cutter rotatably mounted on the bearing supporting member.

9. A support for a roller cutter of a rotary drill bit comprising a pair of spaced side wings, an intermediate web connecting said wings, and a bearing extending from said web.

10. A support for roller cutter of a rotary drill bit comprising a pair of spaced side wings, an intermediate web connecting the wings, said wings extending in the same direction from said web, and a bearing extending from said web in another direction.

11. A support for a roller cutter of a rotary drill bit according to claim 10, in which the side wings are of generally triangular shape.

12. A roller bit comprising a bearing member; a cutter rotatably mounted on said bearing member; and means for securing said cutter to the bearing member comprising a pin passing through a bore in said bearing member and threadedly connected to said cutter, said pin having a longitudinally extending bore therein, and a lock screw threaded within said longitudinal bore and engageable with said cutter to prevent relative turning between said pin and cutter.

13. A roller bit as defined in claim 12, in which said pin is provided with a head engageable with said bearing member for resisting endwise thrusts on said cutter, said pin bore extending through said head to permit insertion and removal of said lock screw from said pin.

14. A roller bit comprising a bearing member; a cutter rotatably mounted on said bearing member; means for securing said cutter to the bearing member comprising a plurality of generally radially movable rollable pins on the bearing member adapted to enter an annular groove provided in said cutter, and a pin movable without rotation within said bearing for causing outward movement of said radial pins and for holding them in said annular groove.

15. In a rotary drill bit, the combination of a shank adapted for attachment to a drill stem and having a thrust surface; a bearing supporting member detachably secured to said shank, a bearing extending from said member, a cutter rotatably mounted on said bearing, means for securing said cutter to the bearing comprising a plurality of generally radially movable pins on the bearing member adapted to enter an annular groove provided in said cutter, and a pin movable without rotation within said bearing for causing outward movement of said radial pins and for holding them in said annular groove, said pin confronting the thrust surface on said shank whereby it is prevented from moving from said bearing.

16. In a rotary drilling bit, the combination of a shank having one or more depending legs provided with a thrust surface inclined with respect to the longitudinal axis of the shank, a bearing supporting member embracing each leg and having a surface cooperable with said thrust surface in load transmitting relation, means securing the bearing supporting member to the leg, and a cutter mounted on the bearing supporting member.

ROBERT P. FISHER.